United States Patent

Gannon et al.

[11] Patent Number: 5,842,555
[45] Date of Patent: Dec. 1, 1998

[54] AUTOMATED BAGGAGE TRACKING SYSTEM AND METHOD FOR USE IN A BAGGAGE CONVEYOR SYSTEM

[76] Inventors: Donald N. Gannon, 11208 Candlelight Ln., Dallas, Tex. 75229; Jack Graves, 628 W. 6th, Irving, Tex. 75060

[21] Appl. No.: 766,065

[22] Filed: Dec. 16, 1996

[51] Int. Cl.[6] .................................................. B65G 37/00
[52] U.S. Cl. .................... 198/358; 198/349.5; 198/349.9
[58] Field of Search ................. 198/348, 349.8, 198/349.6, 349.9, 349.95, 358

[56] References Cited

U.S. PATENT DOCUMENTS

| | | | |
|---|---|---|---|
| 3,785,510 | 1/1974 | Gsooteboes ........................... | 198/349.9 |
| 3,880,298 | 4/1975 | Habegges et al. .................. | 198/349.95 |
| 4,564,102 | 1/1986 | Mosi et al. ...................... | 198/349.95 X |
| 5,018,928 | 5/1991 | Hartlepp .................................. | 414/339 |
| 5,575,375 | 11/1996 | Sandusky et al. ....................... | 198/358 |

FOREIGN PATENT DOCUMENTS

| | | |
|---|---|---|
| 1393217 | 5/1975 | United Kingdom . |
| 2293807 | 4/1996 | United Kingdom . |
| WO 97/09258 | 3/1997 | WIPO . |

Primary Examiner—James R. Bidwell

[57] ABSTRACT

The present invention is an automated baggage tracking and sorting system having a conveyor system controlled by a system controller, and a distributed baggage identification system. The distributed baggage identification system comprises a plurality of zone content identifiers coupled to one or more of a plurality of conveyors at predetermined locations to create a plurality of zones. Each of the zones is associated with one of the plurality of zone content identifiers, and each of the zone content identifiers is configured to store information pertaining to the object located in the associated zone. The distributed baggage identification system further comprises a plurality of information retrievers positioned adjacent to the conveyors at predetermined transition regions. The information retrievers are configured to retrieve information from the zone content identifiers as the associated zone is at the transition region. The distributed baggage identification system also comprises a plurality of information providers positioned adjacent to the conveyors at predetermined transition regions. The information providers are configured to transfer information to the zone content identifiers when the associated zone is at the transition region.

14 Claims, 3 Drawing Sheets

AUTOMATED BAGGAGE TRACKING SYSTEM AND METHOD FOR USE IN A BAGGAGE CONVEYOR SYSTEM

BACKGROUND OF THE INVENTION

1. Field of the Invention

The present invention is directed generally to automated baggage tracking systems and, more particularly, to tracking baggage on a conveyor system.

2. Description of the Related Art

Baggage conveyor systems have been long used in commercial airports. In recent years, such systems have included automated baggage tracking systems to reduce the extent of human intervention required to move baggage from increasingly distributed check-in counters to the aircraft.

FIG. 1 depicts an exemplary embodiment of a conventional automated baggage tracking system 100. In the conventional automated baggage tracking system 100, baggage is initially collected at various input points, such as check-in counters 102. Typically, at the check-in counters 102 the baggage is initially placed on a scale/tagging conveyor 104 at which the baggage is weighed and processed by a clerk. Once processed, the baggage is manually forwarded to a queue/dispatch conveyor 106 that automatically conveys the baggage to a collection conveyor 108. Although only one is illustrated in FIG. 1, there may be any number of such collection conveyors 108 in an airport.

The baggage is transferred to one or more intermediate load conveyors 110 via well known sort pushers 112. The baggage is then transported along an additional conveyor 114 as necessary to route the baggage to a centralized primary sort matrix area 116.

Broadly stated, at the centralized sort matrix area 116, each piece of baggage is identified, sorted and placed onto a downstream conveyor belt 118 leading to its final destination. At the matrix area 116 information regarding each piece of baggage is identified and provided to a main system controller (not shown). The baggage is then forwarded onto an appropriate downstream conveyor 118 associated with a desired destination. The system controller then manages the transportation of the baggage along this and other downstream conveyors (not shown) to bring the baggage to its final sort destination, such as a commercial aircraft.

There are a number of drawbacks with these conventional systems. Oftentimes, the baggage travels along a significant length of one or more collection and load conveyors 108, 110, before reaching the centralized sort matrix area 116. During this time, the controller has not yet been provided with the baggage information, and thus, cannot track the baggage. It is believed that this delay in baggage identification significantly contributes to lost and misplaced baggage.

In addition, limited information is utilized by conventional baggage tracking systems. Typically, such information includes the final destination (provided on the baggage) and relative position of each piece of baggage on the downstream conveyors 118 (determined by the controller). Specific baggage identification information is not necessary for conventional systems to make the necessary routing decisions. As a result, baggage cannot be particularly identified nor tracked while being transported through the system.

Furthermore, utilization of a centralized sort matrix area increases the complexity of the baggage sorting system. The centralized sort matrix requires a complex array of conveyor belt segments to deliver the baggage received at each input location throughout the airport. In addition to the cost associated with such an arrangement, the centralized nature of the sort matrix adversely impacts the efficiency of the baggage forwarding process, limiting the total number of bags that can be transported through the system at a given time.

For example, there are time limitations associated with the identification of each bag, particularly since this task is often performed manually. Similarly, there are time limitations associated with the manual transfer of the baggage to the appropriate downstream conveyors. Even when baggage identification is performed with the assistance of a hand-held scanner, the sorting at the matrix area is considerably time consuming since every bag is processed through this centralized area.

Once the bags are manually transferred from the primary sort matrix 116 to the appropriate downstream conveyor 118, the system controller, having determined the route for a bag's final sort location, typically implements a tracking program that utilizes signals transmitted from photo sensors as well as belt tachometers located along the conveyor route to the final sort destination. The need to route all bags through the matrix area is necessitated by the limitations of the tracking programs and the costs of the laser scanner arrays.

What is needed, therefore, is a simplified means for sorting and tracking baggage that will increase the efficiency of the baggage forwarding system while reducing the occurrences of lost or misplaced baggage.

SUMMARY OF THE INVENTION

The present invention is an automated baggage tracking and sorting system having a conveyor system controlled by a system controller, and a distributed baggage identification system. The distributed baggage identification system comprises a plurality of zone content identifiers coupled to one or more of a plurality of conveyors at predetermined locations to create a plurality of zones. Each of the zones is associated with one of the plurality of zone content identifiers, and each of the zone content identifiers is configured to store information pertaining to the object located in the associated zone.

The distributed baggage identification system also comprises a plurality of information retrievers positioned adjacent to the conveyors at predetermined transition regions. The information retrievers are configured to retrieve information from the zone content identifiers as the associated zone is at the transition region. The distributed baggage identification system further comprises a plurality of information providers also positioned adjacent to the conveyors at predetermined transition regions. The information providers are configured to transfer information to the zone content identifiers when the associated zone is at the transition region.

The system controller utilizes the zone content information for identifying and tracking baggage traveling through the conveyor system. The system controller also transmits control commands to the conveyor system in accordance with routing decisions based upon the contents of the conveyor system zones.

Significantly, when baggage is transferred from one conveyor zone to another, an information retriever obtains the associated baggage information from the zone content identifier of the source conveyor zone and transfers the information to the zone content identifier associated with destination conveyor zone. This enables the baggage information to travel with the baggage at all times as it travels through the conveyor system.

Advantageously, the present invention does not require a centralized sort matrix area to gather tracking-related information, thereby reducing the complexity of the implementing conveyor system.

Another advantage of the present invention is that it does not require either the manual encoding or laser tag reading of the baggage once it has begun traveling along the conveyor system, thereby reducing the equipment and labor costs as well as inherent errors associated with conventional baggage tracking systems.

Furthermore, the present invention provides for systematic and selective communication between the system controller and the conveyor system in order to update and control the tracking and sorting of objects on a conveyor belt. As a result of the ability to continually communicate and update the system controller regarding the status of baggage, a baggage's content and location can be identified at any location on the conveyor system and at any time. This enables the present invention to advantageously simplify baggage tracking while increasing sorting accuracy.

Further features and advantages of the present invention as well as the structure and operation of various embodiments of the present invention are described in detail below with reference to the accompanying drawings. The principles and features of this invention may be employed in various and numerous embodiments without departing from the scope of the invention. In the drawings, like reference numbers indicate identical or functionally similar elements.

BRIEF DESCRIPTION OF THE DRAWINGS

For a fuller understanding of the nature of the invention, reference should be had to the following detailed description taken in connection with the accompanying drawings, in which.

DETAILED DESCRIPTION OF THE PREFERRED EMBODIMENTS

Figure 2:
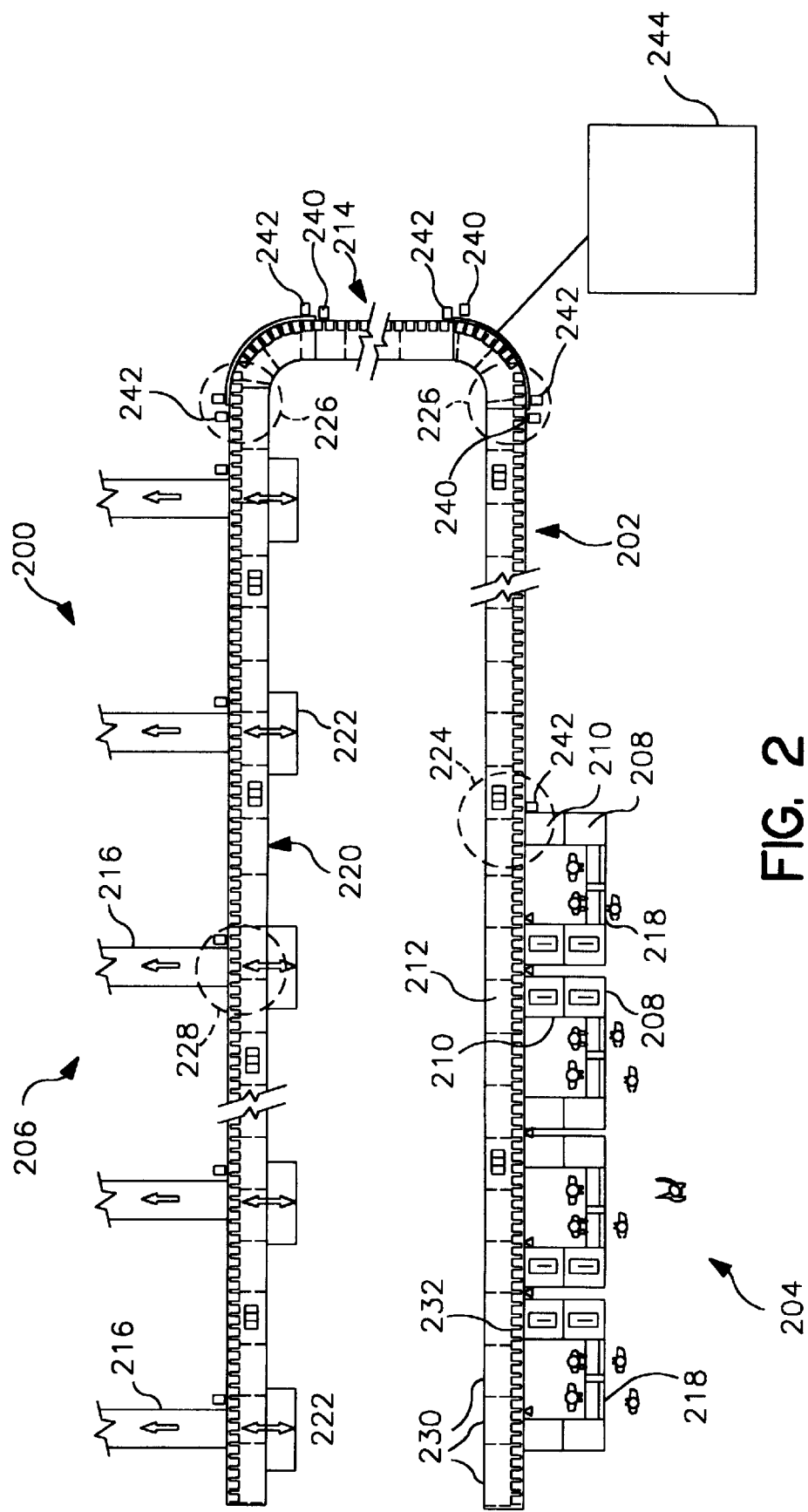
FIG. 2 is a top plan view of an automated baggage tracking and sorting system of the present invention having a conveyor system and a distributed baggage identification system.

FIG. 2 is a top plan view of the automated baggage tracking and sorting system 200 of the present invention. System 200 includes a conveyor system 202, a distributed baggage identification system of the present invention, and a tracking system controller 244 that controls the conveyor system 202 based upon information provided to it from the distributed baggage identification system. The distributed baggage identification system includes RF zone content identifiers 232, which are RF integrated circuits, or chips, imbedded in the conveyor belt, RF readers 240, and RF programmers 242.

Referring to FIG. 2, the conveyor system 202 comprises a plurality of conveyors, each performing a different function to effect the transfer of baggage from a check-in area 204, which may include curbside check-in or ticket counter check-in, to a particular final sort area 206.

In the arrangement illustrated in FIG. 2, the conveyor system 202 includes a scale/tagging conveyor 208, a queue/dispatch conveyor 210, a collector conveyor 212, one or more transport conveyors 214, sort conveyors 220, and a plurality of sort piers 216, each of which is associated with a final destination area 206. In general, each of the conveyors may be any known controllable conveyor belt system capable of receiving commands from the system controller 244. Typically such conveyors comprise a conveyor belt of some known configuration moving upon a track assembly (not shown), although other configurations are contemplated by the teachings of the present invention.

Baggage is initially collected at various entry points of the conveyor system 202, such as a check-in counters 218. Typically, at the check-in counters 218 the baggage is initially placed on the scale/tagging conveyor 208 at which time the baggage is weighed and processed. Once processed, the baggage is forwarded to the queue/dispatch conveyor 210. Queue/dispatch conveyor 210 is arranged adjacent to the scale/tagging conveyor 208 such that the baggage may be manually or automatically transferred from one to the other.

To facilitate the following description, at times the conveyor from which the baggage is transferred is generally referred to as the upstream conveyor, whereas the conveyor to which the baggage is transferred is referred to as the downstream conveyor.

Figure 1:
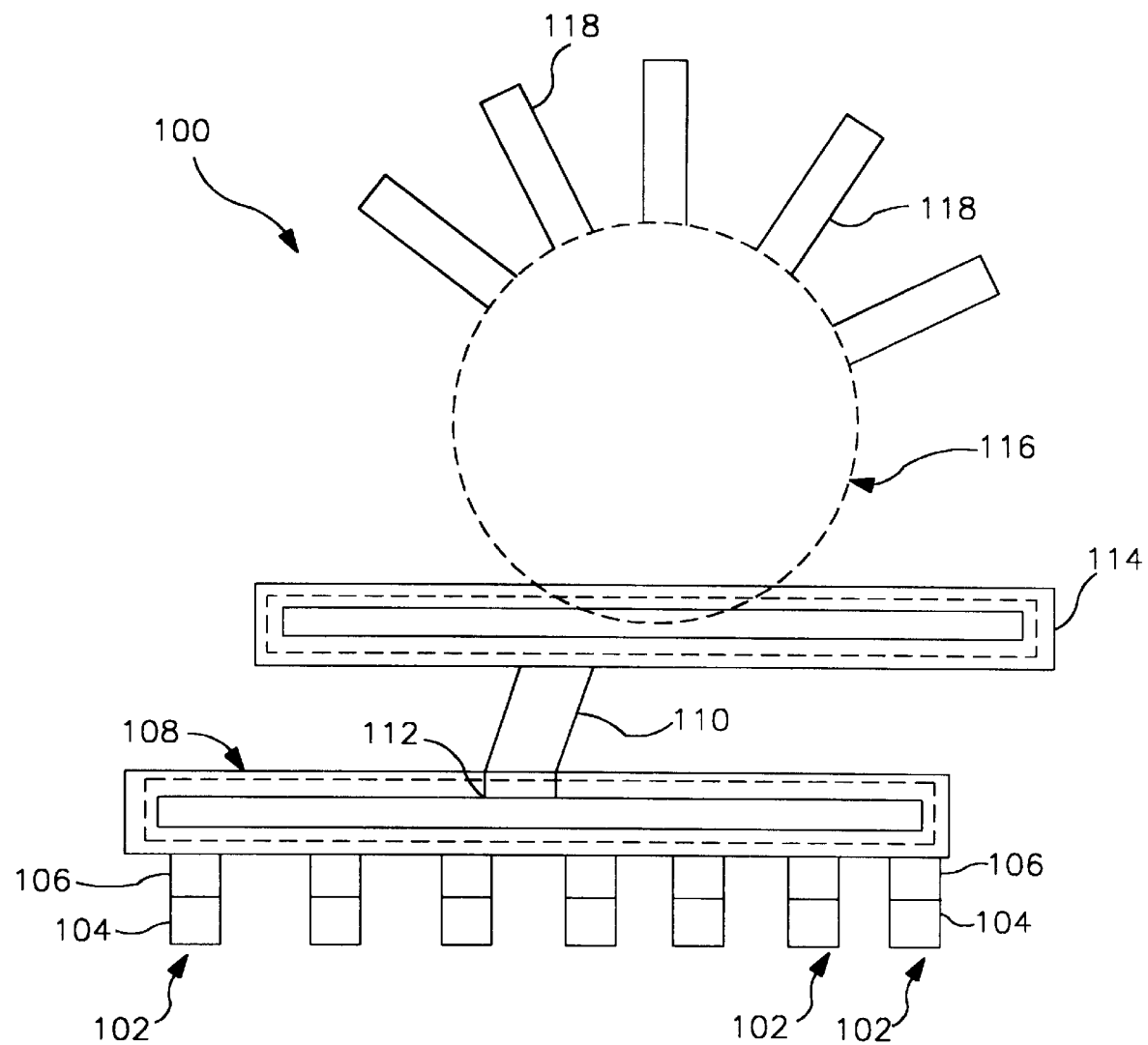
FIG. 1 is a top plan view of a conventional conveyor system.

The collector conveyor 212 is located adjacent to and downstream from the queue/dispatch conveyor 210. The baggage is transferred from the queue/dispatch conveyor system 210 onto the collector conveyor system 212. Although only one is illustrated in FIG. 1, there may be any number of such collection conveyors 212 in an airport.

The transport conveyor 214 represents the one or more conveyors of the conveyor system 202 located downstream from the collector conveyor 212 and upstream from the sort conveyors 220. The transport conveyors 214 may comprise a series of conveyors interconnected to provide paths to many different geographically distributed final destination areas 206.

The sort conveyor 220 is the portion of the conveyor system 202 located downstream from the transport conveyor(s) 214. At the sort conveyor 220, baggage is sorted and directed to their final destination areas by sort pushers 222. When baggage on sort conveyor 220 arrives at a desired sort pier 216, a sort pusher 222 associated with the sort pier operates to transfer the baggage from the sort conveyor 220 to the associated sort pier 216. The baggage then travels along the sort pier 216 to its final destination, such as a pick-up area where the baggage is transferred to a desired aircraft. Sort pushers 222 and other baggage transfer devices that effect a transfer of baggage from one conveyor to another are considered to be well known in the art.

In accordance with the present invention, each of the conveyors 212, 214, 220 in the conveyor system 202 is partitioned into a plurality of conveyor zones or simply zones 230. Each zone 230 has associated with it an RF zone content identifier 232 of the present invention. Each RF zone content identifier stores and makes available information regarding the baggage located in an associated conveyor system zone 230. As will become apparent below, the conveyors are not physically configured into zones; the division is achieved by the placement of the RF zone content identifiers 232. Accordingly, the zones 230 are adjustable; that is, they can be configured to be of any desired length. For example, in a preferred embodiment wherein the present invention is implemented in an automated baggage system in an airport environment, the conveyor zones are approximately 3.5 to 4.5 feet long. However, the RF zone content identifiers may be imbedded at any interval along the conveyor.

In the preferred embodiment of the present invention, the RF zone content identifiers are radio frequency (RF) devices with a memory capacity capable of storing a predetermined quantity of baggage-related information. Such an RF device is considered to be well known in the art. It is understood that the zone content identifier may be secured to the conveyor at its associated zone in any known manner; preferably, the RF devices are imbedded within the conveyor belt of the conveyors to avoid damage.

Each location of the conveyor system 202 wherein one conveyor is positioned adjacent to another such that baggage may be transferred from one conveyor to another is referred to as a transition region. For example, an entry transition region 224 exists between queue/dispatch conveyors 210 and collector conveyor(s) 212. Internal transition regions 226 exist between collector conveyor(s) 212 and transport conveyor(s) 214, between one transport conveyor 214 and another, as well as between transport conveyor(s) 214 and sort conveyors 220. Exit transition regions 228 exits between the sort conveyors 220 and sort piers 216. To facilitate the description of the conveyor system 202, the zone from which a baggage is transferred is referred to as the source zone and the zone to which a baggage is transferred is referred to as the destination zone. Thus, at each transition region baggage passes from a source zone on an upstream conveyor to a destination zone on a downstream conveyor.

Located adjacent to the conveyors at each of the transition regions 224, 226 and 228 is either an RF reader 240 and/or an RF programmer 242. In accordance with the present invention, the RF reader 240 interrogates the RF zone content identifier 232 as the associated zone approaches or reaches the transition region. In a manner described below with reference to FIG. 3, the RF reader 240 transmits the baggage information retrieved from the RF zone content identifier 232 to the system controller 244. The system controller 244 utilizes the RF zone content information for identifying and tracking baggage traveling through the conveyor system, as well as to control the course of the baggage through the conveyor system 202 by transmitting commands to the conveyor system 202.

The system controller 244 processes the information received from the RF reader 240 as described below and transfers the same or other information to the RF programmer 242 for transmission. The RF programmer 242 transfers this information to the RF zone content identifier 232 associated with the destination zone. Significantly, this enables the distributed baggage identification system to continually "carry" all requisite information with a piece of baggage. That is, the baggage identification data will travel with each associated bag on the RF zone content identifiers 232 of each zone 230 of the conveyor that the baggage travels on as it is conveyed throughout the conveyor system 202.

Furthermore, the distributed baggage identification system enables the system controller 244 to determine the status (empty/full) of each zone to facilitate the efficient transfer of baggage through the conveyor system 202. Since the system controller 244 is continually apprised of the location of the baggage as it transitions from upstream conveyors to downstream conveyors, it can instantaneously determine the location of the baggage in the conveyor system 202.

It can be seen that there are generally three types of transition regions. In entry transition regions 224 where baggage enters the conveyor system 202 there is an RF programmer 242 to program the first RF zone content identifier 232 of the destination zone that receives the baggage. Transition regions 226 are regions wherein the baggage is transferred from one conveyor to another as the baggage navigates through the conveyor system 202. At these internal transition regions 226 there is an RF reader 240 and an RF programmer 242 to effect the transfer of baggage information with the transfer of the baggage as described herein. Finally, in the exit transition regions 228, where baggage exits the conveyor system 202, there is an RF reader to read the RF zone content identifier of the sort conveyor zone to determine if the baggage is to exit the conveyor system at this sort pier. No RF programmer 242 is necessary at these exit transition regions 228 since the baggage is positioned at the sort pier associated with its final destination area 206.

Figure 3:
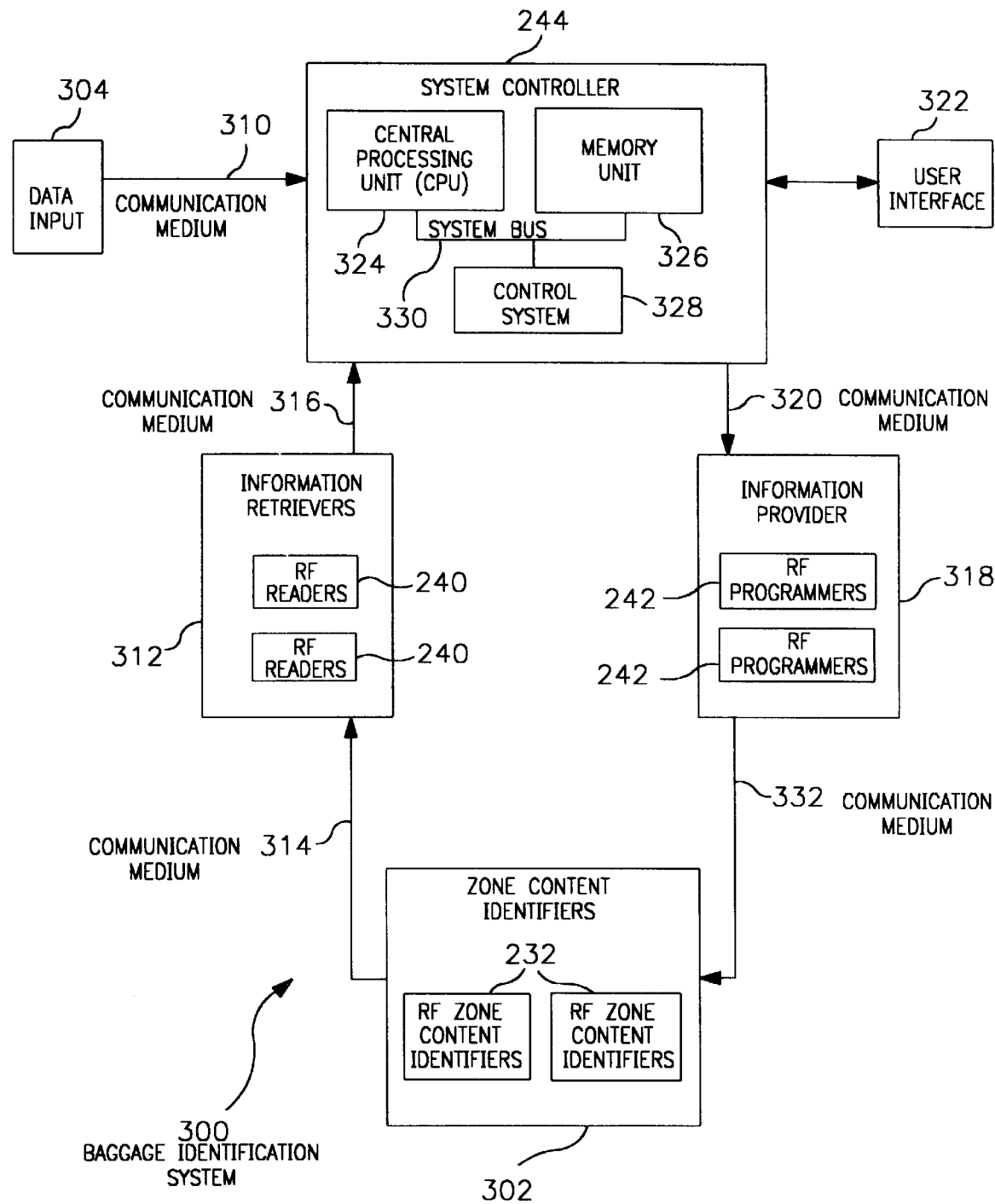
FIG. 3 is a schematic block diagram of the distributed baggage identification system of the present invention.

Operationally, when baggage is initially introduced into the conveyor system 202, information pertaining to the specific baggage is provided to the distributed baggage identification system 300 of the present invention (shown in FIG. 3). In the illustrative embodiment of an airport baggage conveyor system, this preferably occurs at the check-in counters 218.

When passengers check their baggage, the baggage is placed on the scale/tagging conveyor 208 and data is entered into the airline's computers via terminals at the check-in counter 218. In the preferred embodiment, this information includes baggage-related information that is also provided to the system controller 244 via any known means. For example, the system controller 244 may actually be part of the airline's computer systems, in which case the data may be available in a common area in the memory of the computer.

Alternatively, the system controller 244 may be a separate computer system which is coupled through any known means with the airline computers which are equipped with means for automatically transferring predetermined baggage-related information. Thus, as the check-in agent enters the baggage-related information into the terminal coupled to the airline computers, the information is also transferred to the system controller 244.

Once the baggage is processed, it is transferred onto the queue/dispatch conveyor 210. The system controller determines the preferred route through the conveyor system 202 to the desired final destination area 206 for the baggage. The system controller 244, with knowledge of the contents of every conveyor zone 230 in the conveyor system 202 due to the implementation of the present invention, controls the transfer of the baggage from one conveyor to the next to transport the baggage through the conveyor system 202.

When an available zone 230 of the collector conveyor 212 enters the transition region 224, the system controller 244 generates control commands to the queue/dispatch conveyor 210 to load the baggage onto the available collector conveyor zone 230. The control of the conveyor system 202 by the system controller 244 is considered to be well known in the art.

The system controller 244 transfers the baggage-related information to the RF programmer 242 located at the associated entry transition region 224 in a manner described below with reference to FIG. 3. The RF programmer 242 transmits this information to the RF zone content identifier 232 associated with the zone 230 on the collector conveyor 212. Thus, baggage-related data associated with each particular baggage is encoded onto the RF zone content identifier 232 by an RF programmer 242 associated with the particular entry transition region 224 into the conveyor system 202.

The data stored in the RF zone content identifier 232 includes information such as whether the conveyor is carrying baggage in the associated zone, and, if it is occupied, baggage identification data associated with the baggage that it is currently carrying. In one embodiment, the bag identification data includes the name and address of the passenger, the baggage destination, and the flight number of the plane transporting the baggage.

For security purposes, the data identification data may also include the originating location (for example, city and country), whether additional review of the baggage is necessary, etc. This information may be used by the system controller to automatically direct the baggage to a secured area for additional investigation, such as a manual search.

The baggage then travels on the collector conveyor 212, until it arrives at an internal transition region 226 associated with the transport conveyor 214 that the baggage is to travel on to its final destination. Although collector conveyor 212 and transport conveyor 214 appear to be contiguous, the present invention may be implemented in conveyor systems having other known arrangements. For example, the collector conveyor 212 and the transport conveyor 214 may be arranged in a spoke-and-hub configuration or may be configured with adjacent runs coupled by one or more transfer mechanisms between the conveyors along the parallel run.

As each zone approaches the internal transition region 226, the RF reader 240 associated with the transition region interrogates the associated RF zone content identifier 232 and transfers the baggage-related information to the system controller 244. When an available zone 230 on the transport conveyor 214 enters the transition region 226, the system controller 244 generates control commands to the conveyor system 202 to effect a transfer of the baggage from a source zone 230 on the collector conveyer 212 to a destination zone on the transport conveyor 214.

This process continues as the baggage navigates through the one or more transport conveyors 214 that may exist in the conveyor system 202 until the baggage arrives at a sort conveyor 220. The baggage travels along the sort conveyor 220 where the zone 230 on which it is placed is interrogated at each exit transition region 228. When the baggage arrives at the exit transition region 228 associated with the baggage's final sort area 206, the system controller 244 controls the sort pusher 222 to transfer the baggage onto the sort pier 216.

The RF zone content identifiers are erased at predetermined locations appropriate for the particular application. Taking the collection conveyor, for example, all RF zone content identifiers 232 may be erased prior to reaching the first check-in counter 218 or after the location at which the baggage is transferred to the transport conveyors 214. Likewise, the sort conveyor RF zone content identifiers 232 may be erased after the last sort pier 216. The zones 230 are then prepared to be re-encoded with new information at the queue/dispatch conveyor.

The continual monitoring and control of the baggage as it is transferred from one conveyor to another enables the present invention to efficiently utilize the conveyor zones to accommodate any type or size baggage. Take, for example, baggage that requires two contiguous zones to be transported. This information may be included in the baggage information stored in the RF zone content identifier 232. For example, the number of requisite zones and the particular zone (zone 1 of 3 zones, zone 2 of 3 zones, and zone 3 of 3 zones) may be included in the stored information. This information may then be used by the system controller 244 to determine when to effect a transfer of the baggage from an upstream conveyer to a downstream conveyor. In the above example, the system controller will wait for three empty adjacent zones on the conveyor and, once they arrive at the transition region, the system controller would execute the transfer of the oversized baggage and encode the baggage identification data on the RF zone content identifiers for the three destination zones using the RF programmer 242.

As seen from the above and FIG. 2, the conveyor system 202 does not include a central matrix area as in conventional systems. This is because the implementation of the present invention eliminates the need to gather tracking-related information after the baggage has entered the conveyor system 202. As a result, the complexity of the implementing conveyor system 202 is significantly reduced, resulting in a more efficient transfer of baggage through the system. In addition, by eliminating the need to manually encode the baggage once it has began traveling along the conveyor system 202, equipment and labor costs are reduced and the inherent errors associated with conventional baggage tracking systems is eliminated.

Furthermore, the present invention provides for systematic and selective communication between the system controller and the conveyor system in order to update and control the tracking and sorting of the baggage. The ability to continually communicate and update the system controller regarding the status of baggage, a baggage's content and location can be identified at any time while in the conveyor system. This enables the present invention to advantageously simplify baggage tracking while increasing sorting accuracy.

The present invention also enables the system controller 244 to dynamically alter or adjust the route that a baggage may take. For example, if the final destination of a baggage has been incorrectly identified, the baggage can be routed to a final sort pier 216 where the baggage is inspected or re-routed as necessary. In addition, the system controller may automatically reroute baggage to another final sort area, i.e., another aircraft, that has not entered the conveyor system 202 in time to reach its final destination.

Due to the inability to anticipate an available area of a conveyor in conventional systems, a significant portion of the conveyor would be unused when its maximum capacity was reached. The present invention partitions the conveyor system into zones which are of a predetermined optimal length to effect the efficient transportation of baggage. That is, selection of an optimal zone size and the selective placing of the baggage on empty zones enables the conveyor to transport a significantly greater number of bags at any given time.

Referring to FIG. 3, the distributed baggage identification system 300 of the present invention is comprised of a number of functional elements. Primarily, system 300 includes zone content identifiers 302 communicably coupled to information retrievers 312 and information providers 318. The information retrievers 312 are configured to transfer data to the system controller 244, which also receives information from data input devices 304 and, optionally, user interface 322. In an alternative embodiment, the information retrievers 312 may provide a direct transfer of baggage identification data to the immediate downstream information provider 318, thereby bypassing communication with the system controller 244.

System controller 244 may be a general-purpose computer comprising a central processing unit (CPU) 324, a memory unit 326 and a baggage tracking and control system 328 interconnected by a system bus 330. The memory unit 326 may comprise storage locations typically composed of random access memory (RAM) devices, which are addressable by the CPU 324 and tracking system 328. An operating system, portions of which are typically resident in memory and executed by the CPU 324, functionally organizes the system controller 244 by, among other things, invoking tracking system operations.

At data input 304, information is entered into the distributed baggage identification system 300. In the illustrative embodiment described above, data input 304 includes the airline computer systems since the requisite information is currently being entered into the airline system terminals at check-in counter 218. However, as one skilled in the relevant art would find apparent, other data input means may be used for receiving the requisite baggage information, particularly when the conveyor system is not directed towards the transportation of baggage in an airport. For example, data input 304 may also include a manual encoding console or laser tag reader (not shown) to facilitate the entering of bag identification data into the system computer 244. Data input 304 transfers this information to the system controller 244 via communication medium 310. Communications medium 310 may include one or more communications methods appropriate for the selected data input devices and methods.

Information retrievers 312 receive information from zone content identifiers 302 via communication medium 314 and subsequently transfer the retrieved information to the system controller 244 via communication medium 316. Similarly, information providers 318 receive information from system controller 244 via communication medium 320 and subsequently transfer the information to the zone content identifier 302 via communication medium 332.

As noted above, in the preferred embodiment, information retrievers 312 include RF readers 240 and information providers 318 include RF programmers 242. Accordingly, in the preferred embodiment, the zone content identifiers 302 include RF zone content identifiers 232 as described above and that the communication mediums 314 and 332 are RF communications. Information retrieval and provider subsystems 312, 318 may utilize appropriate means of communicating with the system controller 244. Furthermore, communications mediums 316, 320 may include a communications bus structure and protocol.

A user interface 322 is optionally provided to provide user access to the baggage tracking information through, for example, a graphical user interface (GUI) or some other display method. Through user interface 322, a user can determine the location of baggage or monitor the operation of the conveyor system.

It should be understood that the present invention has been described with reference to a conveyor system utilized in an airport to transfer baggage. However, it is understood that the present invention may be implemented in other conveyor transport systems, such a in the warehousing of inventory, manufacturing environments, or other environments where information related to the objects being transported through the system may be helpful in the management and control of such objects.

Having thus described at least one illustrative embodiment of the invention, various alternations, modification, and improvements will readily occur to those skilled in the art. Such alterations, modification, and improvements are intended to be within the spirit and scope of the invention. Accordingly, the foregoing description is by way of example only, and is not intended to be limiting. The invention is limited only as defined in the following claims, and the equivalents thereto.

What is claimed is:

1. An automated tracking and sorting system, comprising:
   a plurality of conveyors coupled to each other at transition regions;
   a system controller for controlling said conveyors to effect the conveyance of objects through the system; and
   a distributed baggage identification system, including,
      a plurality of zone content identifiers coupled to one or more of said plurality of conveyors at predetermined locations to create a plurality of zones, each said zone being associated with one of said plurality of zone content identifiers, each said zone content identifier configured to store information pertaining to the object located in said associated zone,
      a plurality of information retrievers positioned adjacent to said conveyors at predetermined transition regions, said information retrievers configured to retrieve said information from said zone content identifiers as said associated zone is at a transition region, and
      a plurality of information providers positioned adjacent to said conveyors at predetermined transition regions, said information providers configured to transfer said information to zone content identifiers when said associated zone is at said transition region.

2. The system of claim 1, wherein said zone content identifiers are imbedded in said conveyors.

3. The system of claim 2, wherein said zone content identifiers are radio frequency chips.

4. The system of claim 1, further comprising:
   a data input device for entering said information into said system controller when the objects are collected at input points.

5. The system of claim 4, wherein said data input device comprises an airline computer.

6. The system of claim 4, wherein said data input device comprises a laser device.

7. A distributed baggage identification system for use in a conveyor system having a plurality of coupled conveyors controlled by a system controller to effect the conveyance of objects through the system, comprising:
   a plurality of zone content identifiers coupled to one or more of said plurality of conveyors at predetermined locations to create a plurality of zones, each said zone being associated with one of said plurality of zone content identifiers, each said zone content identifier configured to store information pertaining to the object located in said associated zone,
   a plurality of information retrievers positioned adjacent to said conveyors at predetermined transition regions, said information retrievers configured to retrieve said information from said zone content identifiers as said associated zone is at transition region, and
   a plurality of information providers positioned adjacent to said conveyors at predetermined transition regions, said information providers configured to transfer said information from to zone content identifiers when said associated zone is at said transition region.

8. A distributed baggage identification system for use in a conveyor system having a plurality of coupled conveyors controlled by a system controller to effect the conveyance of objects through the system, comprising:

a plurality of zone content identifiers coupled to one or more of said plurality of conveyors at predetermined locations to create a plurality of zones, each said zone being associated with one of said plurality of zone content identifiers, each said zone content identifier configured to store information pertaining to the object located in said associated zone, means for transferring said information from said zone content identifiers to said system controller.

9. The system of claim 8, wherein said transferring means comprises:

a plurality of information retrievers positioned adjacent to said conveyors at predetermined transition regions, said information retrievers configured to retrieve said information from said zone content identifiers as said associated zone is at transition region; and a plurality of information providers positioned adjacent to said conveyors at predetermined transition regions, said information providers configured to transfer said information from to zone content identifiers when said associated zone is at said transition region.

10. A method for conveying objects through an automated tracking and sorting system having a plurality of conveyors coupled at transition regions controlled by a system controller to effect the conveyance of objects from a source zone in an upstream conveyor to a destination zone in a downstream conveyor, comprising the steps of:

(a) reading object information from a source zone's zone content identifier by an information retriever when the source zone is at a transition region;

(b) transferring the object information from the source zone's zone content identifier to the system controller;

(c) determining whether the destination zone is an appropriate zone to which the object may be conveyed;

(d) conveying the object from the source zone to the destination zone; and (e) transferring the object information from the system controller to the destination zone's zone content identifier.

11. A method according to claim 10, wherein steps (a) through (e) are repeated at each transition region.

12. A method according to claim 10, further comprising the steps of:

prior to step (a),
inputting the object information into the system controller via a data input device coupled to the system controller; and
transferring the object information into said source zone's zone content identifier from the system controller.

13. A method according to claim 10, further comprising the steps of:

(f) reading the object information contained in the destination zone's zone content identifier at one or more exit transition regions, each exit transition region being associated with a final sort area; and (g) conveying the object from said destination zone to a predetermined one of said final sort areas when said object arrives at said associated exit transition region.

14. A method according to claim 13, wherein said step (g) is performed in accordance with said object information stored in said destination zone's zone content identifier.

\* \* \* \* \*